Patented Sept. 2, 1941

2,254,636

UNITED STATES PATENT OFFICE 2,254,636

MEDICINAL PRODUCT

Verl D. Vangunten, Cleveland, Ohio

No Drawing. Application May 11, 1938,
Serial No. 207,305

6 Claims. (Cl. 167—58)

This invention relates to a medicinal healing art, and in particular to provide an improved product and process of manufacturing the same. There is a well defined need for a covering or bandaging material which may be readily applied to a cut, burn, sore, infected or other unnatural body condition, for the dual purpose of protection thereof and for the application thereto of healing or medicinal agents.

In the past it has been known to apply ointments or similar agents to the affected areas and cover such agents with gauze or other bandaging materials, or to use some form of adhesive tape or covering. The principal purpose of the covering being to protect the area from injury, keep out dirt and in some cases air, and to tend to prevent loss of the medicinal agent. However, such bandaging or covering materials become loose, dirty, absorb a large percentage of the healing agent, and in many cases reduce blood circulation.

A principal object of my invention is to provide a product having a scab forming quality when applied to the affected area and exposed to the air, and containing a medicinal and/or healing agent.

Another principal object is to provide a preferred process of making my improved product.

As a preferred embodiment of my invention I will describe a process by which I may make an artificial scab-forming covering material of general application and usefulness and in which in certain instances I desirably incorporate materials having different medicinal qualities. I preferably make a product which when normally not exposed to the air is viscous or semi-fluid, but when applied to a cut, burn or other injury or affected area will set or form a tough artificial membrane or scab like protective coating, but having far greater flexibility than a natural body formed scab. Having formed a protective artificial membrane over the affected area, the desirability of having already incorporated a medicinal or healing substance in the material applied becomes apparent, to allow healing to proceed beneath the protective coating. Furthermore, the great advantage of having one single substance combining artificial scab-forming and healing qualities will be apparent.

I preferably provide a base such for example as a resin, gum, resinate or an oxide which is put into solution with an oil which may be a mineral or vegetable oil. With this solution I combine any desired medicinal material and a solvent. The medicinal material or substance is chosen according to the nature of the injury, infection, or bruise to be treated.

In preparing a simple product of universal applicability for general healing purposes as well as to protect skin cracks, affected areas, etc., I have found that an oxide base such for example as red lead oxide ($Pb_3O_4$) is readily prepared. The preferred proportions are:

Raw linseed oil ($C_{18}H_{32}O_2$) _____ounce__ 1
Red lead oxide ($Pb_3O_4$) _____do____ ½
Turpentine (gum resin distilled) ($C_5H_8$)
_____do____ ½
Gum camphor_____do____ 1/16

In combining the above proportions I use at least a (2) two cup enamel container (never use metal) and heat the raw linseed oil to between 425° F. and 450° F. Then turn the fire very low. Add the red lead oxide in small proportions (what would amount to two drops). White lead or litharge may be used as a substitute for red lead. As the red lead oxide is added the combination becomes a dark brown color and also becomes a sticky formation. Stir continually on the bottom of the container and do not add the red lead oxide until each small amount is thoroughly stirred in. It may be necessary to turn the fire completely out in case the combination tends to boil over. Add red lead oxide until a stiff pill forms in a test on glass. Finally turn out the fire and let cool until the combination begins to thicken (about 300° F.). Next add the turpentine in which the gum camphor has been dissolved in small amounts stirring continually on the bottom of the kettle. Stir until cool and pour into containers.

The resultant product or ointment in the container may form a thin film over the top which will not destroy its effectiveness in any manner. Apply with an applicator or tooth pick and spread in a thin layer over the affected part. Then cover with a piece of soft crepe tissue paper, to keep the ointment from sticking to other objects, and press same well into place, trimming the edges around the outside of the ointment. While I have preferably mentioned the use of soft crepe tissue paper, it is my conception that any one of a large number of similar materials, such for example as an inert powder, a loosely woven gauze, cotton lint, or the like may be used. The covering of the applied ointment with soft tissue paper, for example, accelerates the formation of a protective outer surface. If such filler or surface binder material is not used on the outer surface, the natural oxidation of the air exposed outer surface of the applied ointment will in time produce a coating or film, but the use of such a material as soft crepe paper on the outer surface greatly shortens the time. The result will be a well formed synthetic scab. This formation eliminates the necessity of gauze or bandage covering of any description, including adhesive tape, and thereby eliminates the absorption of antiseptic materials. This in turn makes possible the use of lesser percentages of antiseptic materials. In cases where (10) ten percent materials are prescribed only (8) or even (5) five percent materials can be used. These lesser percentages are also advisable where the patient's skin is very tender.

The adhesive nature and outer surface congealing of the ointment keeps the affected area clean and dry even though subjected to washing with soap solutions and stays on under the most severe tests for one day and in ordinary circumstances from three to seven days, at the same time providing the healing quality for whatever type of irritation for which it may be prescribed. Since it is placed on the affected area only, it permits of massage around same, which is very effectual in many cases, and while it does not discolor the affected area or the skin adjoining, it may be easily removed as in cases when pimples are treated during an overnight period and the ointment is removed in the morning. When the ointment is applied to ordinary cases there will be no discomfort realized excepting a probable slight tingle for the duration of not more than a second, but in cases where the skin area has been rubbed off and the body bruised as in a fall it causes an aching pain for a short time. In falling one bruises as well as rubs off the skin area, thus causing a double duty to be performed by the ointment in that it must assist in healing and at the same time lessen the inflammation caused by the bruise in falling. If a fall causes several different spots to be bruised and skinned, the areas in some cases, seem to alternate in stinging for a period of from five to fifteen or twenty minutes. When an application is made on an eyelid, as on a sty for instance, it should be made at night so that it is not necessary to use a paper covering. The latter is bulky on an eyelid. It may be used to reduce cysts whether they occur on an eyelid or other parts of the body. The eye area is very sensitive and in some cases will not permit of changing applications oftener than two days at first. In making an application on a cut the area is filled in with the ointment as soon as possible for it has an astringent effect and will therefore assist in stopping the open area from bleeding. Skin cracks, hangnails, ingrown toenails, insect bites, pimples, etc. are treated the same. When the ointment is applied to a burn or scald, in cases where a blister is raised, the latter should be opened as often as the water keeps forming in the blister. In cases of deep burn as with boiling oil the flesh as well as the upper skin may fall away and the ointment should be applied again as soon as this occurs.

A principal object to be attained is to produce a product having a melting point only a few degrees above normal body temperature, and this is accomplished through proper choosing and proportioning of the base and oils used. When such product is applied over an affected area an artificial membrane is formed as previously pointed out. This membrane takes the place of the body formed natural scab which would be supplied by the body if the artificial membrane were not applied. This relieving the body of forming a natural protection facilitates the healing time of the injury as a whole because the body has only the healing properties to perform and not the dual functions of healing plus scab forming. If infection is present beneath the artificial membrane an increase in temperature locally is caused thereby, and together with the moisture effect of pus and the like tend to soften and loosen the scablike membrane and give good warning that infection is present. In many cases this loosening will result in a complete coming off of the scablike membrane from the infected part, leaving any part which is properly healing still covered. When such action occurs, that part which shows infection should be cleaned, if possible, of any visible or apparent foreign matter and immediately recovered with the proper medicinal membrane forming product.

A natural body-formed scab covering is very often deceptive when an infection has developed and is concealed by the scab. With my improved artificially formed scab or membrane a very desirable warning is given, as above pointed out, in contrast to the action of a natural body-formed scab.

To avoid the necessity of having to place a poison label on the finished product as would be required if lead oxides are used, I have found that other ingredients may be substituted for the lead oxide with comparable results, such as resinates, as for example, maleic acid, damar resin, zinc resinate, zinc oxide and many others.

With either the oxide, stearate or resin bases I may combine one or more healing and/or medicinal substances. The preferred proportions for combining different special compounds are as follows:

1

| | | |
|---|---|---|
| Raw linseed oil | ounce | 1 |
| Maleic acid | do | 1½ |
| Turpentine | do | ½ |
| Gum camphor | do | 1/16 |

2

| | | |
|---|---|---|
| Raw linseed oil | ounce | 1 |
| Damar resin | do | 2 |
| Turpentine | do | ½ |
| Chrysarobin | grams | 48 |

3

| | | |
|---|---|---|
| Raw linseed oil | ounce | 1 |
| Maleic acid | do | 1½ |
| Turpentine | do | ¾ |
| Calamine | grams | 48 |

4

| | | |
|---|---|---|
| Raw linseed oil | ounce | 1 |
| Zinc resinate | do | 1½ |
| Turpentine | do | ½ |
| Flowers of sulphur | grams | 48 |

5

| | | |
|---|---|---|
| Raw linseed oil | ounce | 1 |
| Zinc resinate | do | 1½ |
| Turpentine | do | ½ |
| Ammoniated mercury | grams | 96 |

The procedure for combining the above sets of compounds is as follows: The measured weights are in avoirdupois. The raw linseed oil is heated to between 425° F. and 450° F. The resin is melted with the oil in small amounts while the mixture is being stirred constantly from the bottom. The amount of resin used depends upon its solidifying qualities but in all cases resin must be added until upon testing a drop on glass it forms a stiff pill. After the desired resin is put in solution the compound is taken off the fire and stirred until it starts to thicken (about 300° F.). Then the turpentine is added. (If gum camphor or any product that is soluble in turpentine is used as a medicinal agent it is first dissolved in the turpentine and added with the latter.) When antiseptic products such as calamine, flowers of sulphur, ammoniated mercury, chrysarobin, zinc oxide, etc., are used in substituting for the gum camphor it is put in separately and not in combination with the turpentine. In cases such as when calamine is added to the product the latter seems to absorb more of the oils than the other products and an additional amount of turpentine is required to keep the finished product in a gummy state. Hence ¾ oz. turpentine is used where such products as calamine are used in combination as in Formula #3.

6

| | | |
|---|---|---|
| Raw linseed oil | ounce | 1 |
| Aluminum stearate | do | ½ |
| Zinc stearate | do | 1¾ |
| Turpentine | do | 2½ |
| Maleic acid | do | 1½ |
| Gum camphor | do | ⅛ |

If it is desired to use the stearates for a base, a resin such as maleic is used to give the proper sticking qualities. Gum elemi or Bexin would substitute for maleic acid with good results. The procedure for combining the above compound is as follows: The measured weights are in avoirdupois. The oil is heated to 450° F. Melt ¼ oz. aluminum stearate with the oil. Then melt 1 oz. zinc stearate with the combination. Next melt in the other ¼ oz. aluminum stearate. And finish the melting of the stearates by adding the remaining ¾ oz. zinc stearate or until the test on glass shows a stiff dark pill. 1½ oz. maleic acid is then melted in to produce the sticky formation. The whole process requires continual stirring from the bottom of the container. At this point turn out the fire and let cool until it begins to thicken (about 300° F.). ⅛ oz. gum camphor is dissolved in the turpentine and this solution is slowly stirred into the compound.

7

| | | |
|---|---|---|
| Raw linseed oil | ounce | 1 |
| Zinc oxide | do | ½ |
| Turpentine | do | 1 |
| Elemi resin | do | ⅛ |
| Potassium permanganate | grams | 10 |

8

| | | |
|---|---|---|
| Raw linseed oil | ounce | 1 |
| Zinc oxide | do | 1 |
| Turpentine | do | 1¼ |
| Elemi resin | do | ⅛ |
| Boric acid | grams | 48 |

9

| | | |
|---|---|---|
| Dehydrated synthetic castor oil | ounce | 1 |
| Zinc oxide | do | ¼ |
| Turpentine | do | 1¼ |
| Elemi resin | do | ⅛ |
| Gum camphor | do | 1/16 |

The procedure for combining the above listed sets of compounds is as follows: The oil desired is heated to between 525° F. and 550° F. and the zinc oxide is melted with the oil in small amounts while the mixture is being stirred constantly from the bottom. The amount of oxide used depends upon the solidifying qualities but in all cases the oxide must be added until testing on glass it forms a stiff pill. After the desired amount of oxide is melted with the oil the compound is taken off the fire and stirred until it starts to thicken (about 300° F.). Next stir in the turpentine slowly. (If gum camphor or any product that is soluble in turpentine is in the formula it is first dissolved in the turpentine and added with the latter.) Then add the elemi resin, stirring constantly. (In cases where bases such as zinc oxide are melted with an oil and the finished product tends to set upon standing, a product such as elemi resin is added to hold the product in a gummy state.) Finally stir in the required medicinal agent such as boric acid, potassium permanganate, calamine, etc.

There are as many uses for this membrane forming material prepared with special medicinal agents as there are different kinds of skin irritations. There are several different types of impetigo for instance and after the type has been diagnosed the special membrane forming material is used which conforms to the prescription from the attending physician. The antiseptic used for some types of itching impetigo is ammoniated mercury and a formula such as the above special #5 would be used.

Impetigo is known as an inflammatory skin disease characterized by isolated postules. To combat impetigo it is necessary to treat the area with the proper agent. This is readily accomplished with my improved product. When the affected area is covered with the membrane forming material the outer surface provides a protective covering, while the inner surface remains more plastic and attaches itself to the scaly formation of the body skin over the impetigo area. As in the case of infected areas previously mentioned the membrane tends to become loose and either fall off or should be removed, carrying with it the scales attached thereto. Application of the plastic material should be immediately repeated, and this procedure continued so long as the scales form and cause a loosening of the artificial membrane. While this action is going on a dual benefit is being accomplished, in that with the periodic removing of the scaly skin particles the germ is approached closer with each removal of the old membrane and application of new membrane forming material and is being attacked by the particular medicinal properties of the product which has been prescribed for the particular type of impetigo germ.

Psoriasis is generally considered to be an incurable skin infection but those so affected get definite relief with the membrane forming material containing sulphur which is the #4 formula listed above. If a psoriasis patient wishes to attack the disease to receive relief by clearing the scabby area he would rotate a series of the Formula #4, which contains sulphur, and #2 which contains chrysarobin. The #4 or membrane forming material which has the sulphur content starts the action and prepares for the #2 formula containing chrysarobin, which is an irritating agent and tends to clear off the scabs.

There are many types of eczema and as many causes for the irritation of the skin which come under this heading and the attending physician might prescribe calamine and Formula #3 would be used. Or he might want to use a boric acid content and Formula #8 would be used.

One important feature of my invention is in connection with the use of such products as chrysarobin, and potassium permanganate for medicinal purposes. The use of chrysarobin as an irritant and for the treatment of many conditions is well known. The use of potassium permanganate is also well known as an antiseptic. A great drawback to their use or application has been the fact that they stain and discolor anything contacted, with a stain that is practically non-removable. I have found that such products as chrysarobin and potassium permanganate may be compounded and applied as herein disclosed with entire safety so far as staining is concerned. This may be attributed to at least three things: (1) Compounding in my preferred method. (2) The membrane-like congealing of the outer surface of the applied ointment (containing chrysarobin or potassium permanganate) prevents the softer under portion from contacting clothing. (3) The use of paper or other filler material to hasten the congealing of the outer surface of the medicated artificial membrane.

While I have described certain preferred embodiments of my invention, I contemplate that the process may be performed in other specific manners and that the product may assume other specific forms.

What I claim, and desire to secure by Letters Patent of the United States, is:

1. A temporary skin substitute for application to abrasions, cuts and open sores containing a base material in the form of an inorganic pigment from the group consisting of lead oxide, zinc oxide and zinc resinate, a drying oil which has been heated and maintained at a temperature sufficiently long so that upon cooling it will surface harden; a solvent for the drying oil and a topical medicinal substance; the product being normally semi-fluid until exposed to the air; then surface hardening to scab-like consistency in about one hour.

2. A temporary skin substitute for application to abrasions, cuts and open sores containing a base material in the form of an inorganic pigment of the group consisting of lead oxide, zinc oxide and zinc resinate, a drying oil which has been heated and maintained at a temperature sufficiently long so that upon cooling it will surface harden, turpentine and a topical medicinal substance; the product being normally semi-fluid until exposed to the air; then surface hardening to scablike consistency in about one hour.

3. An artificial scab-forming medicinal composition of matter containing the reaction product of linseed oil and zinc oxide heated to a temperature of at least 425° F. for over an hour in the proportion of one-half to one part of zinc oxide to one part of linseed oil; an amount of turpentine approximately equal to the linseed oil, a smaller portion of a resin, and a topical medicinal substance.

4. An artificial scab-forming medicinal composition of matter containing the boiled reaction product of raw linseed oil and zinc oxide which has been boiled sufficiently so that a stiff pill is formed when testing on glass, an amount of turpentine sufficient to render the boiled reaction product semi-fluid, a plasticizer and a topical medicinal agent.

5. An artificial scab-forming medicinal composition of matter containing the boiled reaction product of raw linseed oil and zinc oxide which has been boiled sufficiently so that a stiff pill is formed when testing on glass, an amount of turpentine sufficient to render the boiled reaction product semi-fluid and a topical medicinal agent.

6. The process of producing a composition of matter having adhesive qualities capable of surface hardening and with medicinal properties, which includes, heating raw linseed oil at over 425° F. slowly melting in sufficient zinc oxide to obtain a consistency such that a stiff pill is formed when testing on glass, adding turpentine in which a small portion of a resin and a topical medicinal substance has been dissolved and maintaining the ingredients at over 300° F. for at least one hour to obtain a product having a semi-fluid consistency capable of being applied with an applicator or brush.

VERL D. VANGUNTEN.